(12) United States Patent
Yang et al.

(10) Patent No.: US 7,523,529 B2
(45) Date of Patent: Apr. 28, 2009

(54) ENGAGEMENT MECHANISM

(75) Inventors: Yung-Chi Yang, Taipei (TW); Yue-Jun Hu, Shanghai (CN); Mike Cai, Shanghai (CN); Li-Ming Le, Shanghai (CN)

(73) Assignee: Inventec Corporation, Taipei (TW)

( * ) Notice: Subject to any disclaimer, the term of this patent is extended or adjusted under 35 U.S.C. 154(b) by 20 days.

(21) Appl. No.: 11/092,764

(22) Filed: Mar. 30, 2005

(65) Prior Publication Data

US 2006/0137152 A1    Jun. 29, 2006

(30) Foreign Application Priority Data

Dec. 23, 2004    (TW)    ............... 93220734 U

(51) Int. Cl.
*G06F 1/16*    (2006.01)
(52) U.S. Cl. .............. 24/611; 24/643; 24/683; 24/647; 24/609; 292/121; 292/128; 292/108; 292/304; 292/219; 403/325; 403/322.1; 403/327; 403/131
(58) Field of Classification Search ........... 24/609, 24/611, 643, 647; 292/121, 128, 108, 107, 292/219, 209, 304, DIG. 11, 11, DIG. 43; 403/325, 322.1, 327, 322.4, 121, 128, 131; 16/DIG. 32, 726, 107, 255, 292; 49/72, 27, 49/33; 361/726, 683; 70/159; 369/75.11; 455/575.1
See application file for complete search history.

(56) References Cited

U.S. PATENT DOCUMENTS

| | | | | |
|---|---|---|---|---|
| 2,634,147 A | * | 4/1953 | Robertson | ............ 292/216 |
| 2,797,115 A | * | 6/1957 | Rawden et al. | ............ 292/11 |
| 3,578,368 A | * | 5/1971 | Dupuis | ............ 292/45 |
| 4,964,661 A | * | 10/1990 | Cadwell et al. | ............ 292/87 |
| 5,025,776 A | * | 6/1991 | Hanley et al. | ............ 126/194 |
| 5,094,484 A | * | 3/1992 | Bang | ............ 292/120 |
| 5,224,752 A | * | 7/1993 | Marshall | ............ 296/146.1 |
| 5,281,045 A | * | 1/1994 | Ichikawa | ............ 403/329 |
| 5,310,358 A | * | 5/1994 | Johnson et al. | ............ 439/358 |
| 5,868,446 A | * | 2/1999 | Rossmo | ............ 292/341.17 |
| 5,997,323 A | * | 12/1999 | Youn | ............ 439/159 |
| 6,065,896 A | * | 5/2000 | Jermyn, Jr. | ............ 403/322.4 |
| 6,181,550 B1 | * | 1/2001 | Kim | ............ 361/683 |

(Continued)

FOREIGN PATENT DOCUMENTS

TW    244713    8/1983

(Continued)

*Primary Examiner*—Robert J. Sandy
*Assistant Examiner*—Marcus Menezes
(74) *Attorney, Agent, or Firm*—Muncy, Geissler, Olds, & Lowe, PLLC

(57) ABSTRACT

The present invention proposes an engagement mechanism employed in a first assembly part and a cooperating second assembly part. The engagement mechanism comprises a pivot member assembled in the first assembly part; and an elastic member having a double-wedged surface at an endmost portion thereof which extends outwardly from the projecting portion of the first assembly part. The elastic member is employed to provide an elastic force of maintaining the projecting portion extending outwardly from the first assembly part to engage with the second assembly part. The present invention, via the design of the double-wedged surface of the projecting portion, facilitates easy engagement or disengagement of the engagement mechanism, and overcomes the problem of having to provide extra disengagement arrangement in the prior art.

10 Claims, 4 Drawing Sheets

U.S. PATENT DOCUMENTS

| | | | |
|---|---|---|---|
| 6,256,194 B1 * | 7/2001 | Choi et al. | 361/683 |
| 6,305,676 B1 * | 10/2001 | Peng | 267/160 |
| 6,421,247 B1 * | 7/2002 | Fuchimukai | 361/759 |
| 6,510,051 B2 * | 1/2003 | Kim | 361/686 |
| 6,616,199 B1 * | 9/2003 | Tokach et al. | 292/56 |
| 6,659,516 B2 * | 12/2003 | Wang et al. | 292/251.5 |

FOREIGN PATENT DOCUMENTS

TW        508562        5/2000

\* cited by examiner

ENGAGEMENT MECHANISM

CROSS-REFERENCE TO RELATED APPLICATION

This application claims priority from Taiwan Patent Application Serial No. 093220734, filed Dec. 23, 2004, the disclosure of which is hereby incorporated by reference in its entirety.

FIELD OF THE INVENTION

The present invention relates to an engagement mechanism, and more specifically, to an engagement mechanism for engaging two assembly parts.

BACKGROUND OF THE INVENTION

Engagement mechanism is widely used, which may be employed in any assembly between two assembly parts, as long as disassembly possibility is to be considered.

Conventional engagement mechanism employed for assembling, disassembling the assembly parts is usually composed of locking tenon, spring and single-wedged surface barb. When two assembly parts are assembled, the barb is pressed aslant along its single-wedge surface to engage and secure the two assembly parts. In disassembly, the barb has to be pushed from inward via additional tools to release the engagement, which is extremely inconvenient for an assembly operator. Consequently, engagement mechanism incorporated release mechanism is designed as follow.

TW Utility Model Patent Publication No. 244713 discloses a lateral plate engagement mechanism incorporated a release mechanism, which comprises: a frame, the frame is arranged with a rear plate which defines a cutout; a lateral plate, the lateral plate is moveably assembled to a side of the frame, one end of the lateral plate adjacent the rear plate forms an accommodating portion, the accommodating portion forms a pair of positioning holes; and a locking device accommodated in the accommodating portion of the lateral plate comprising a box member, a clasp structure accommodated in the box member, and a handle. One side of the box member forms a pair of positioning holes; a top portion of the box member forms an elongated groove; a pair of protruding posts extends from an inner side of the box member. The clasp structure comprises a pair of buckling bars and an elastic portion. One end of the buckling bar pivotally connects the protruding post, and the other end extends outwardly from the positioning hole of the box member. The buckling bar connects the elastic portion, and the elastic portion is adjacent to the handle. Wherein, after the locking device is secured to the accommodating portion of the lateral plate, the other end of the buckling bar extends outwardly from the positioning hole of the accommodating portion. After the lateral plate is assembled to the frame, said other end of the buckling bar abuts against both sides of the cutout of the rear plate to secure the lateral plate. In disassembling the lateral plate, the handle is pressed through the elongated groove of the box member; the handle abuts against the elastic portion; the elastic portion deforms and drives the buckling bar to retract, so that said other end of the buckling bar retracts from the cutout. This prior art patent provides convenience for releasing engagement without the help of extra tools, however, much more complex mechanism is needed, and its cost is relatively increased. In the meantime, extra disengagement procedure (pressing the handle through the elongated groove of the box member) is required to release the engagement, which is still an inconvenient design for the assembly operator.

In addition, TW Utility Model Patent Publication No. 506562 also discloses an engagement mechanism incorporated with release mechanism without screw used to engage a computer housing having a flange and a computer main body. The engagement mechanism comprises: an engagement body having a plurality of long hooks and a plurality of short hooks; a cover member covering the engagement body having a plurality of locking tenons; a locking groove set provided on the computer main body having a plurality of locking grooves for engaging with the engagement body and also limiting transverse movement of the engagement member while enabling the longitudinal movement of the engagement member; and a locking ring, which is arranged on the flange of the computer hosing at a position corresponding to the locking groove set. When the computer housing engages with the computer main body, the locking ring is embedded in the long hook of the engagement body and the computer main body, therefore preventing the computer housing from disengaging. This prior art patent provides convenience in releasing without using extra tools and screws. However, much more complex mechanism is needed, and the cost is relatively increased. At the same time, extra disengagement procedures (moving the cover member and the engagement body) are needed to release the engagement, which is also still an inconvenient design for the assembly operator.

All of the abovementioned conventional mechanism cannot provide convenience and practicability in disengagement. Consequently, there is a need to provide an engagement mechanism that provides easy engagement/disengagement eliminating extra disengagement design in order to simplify structure and lower cost.

SUMMARY OF THE INVENTION

Regarding the drawbacks of the abovementioned conventional techniques, the primary objective of the present invention is to provide an engagement mechanism facilitating engagement or disengagement.

Another objective of the present invention is to provide an engagement mechanism free of disengagement design.

Still another objective of the present invention is to provide an engagement mechanism having simplified structure.

Yet another objective of the present invention is to provide an engagement mechanism having reduced cost.

In accordance with the above and other objectives, the present invention proposes an engagement mechanism, which is employed in a first assembly part and a cooperating second assembly part. The engagement mechanism comprises a pivot member provided in the first assembly part to freely pivot therein, the pivot member comprises a projecting portion which can extend outwards from the first assembly part, an endmost portion of the projecting portion having a double-wedged surface; and an elastic member arranged between the first assembly part and the pivot member providing elastic force for maintaining the projecting portion extending outwards from the first assembly part to engage with the second assembly part.

The above pivot member is pivoted in the first assembly part via a spindle. Preferably, the pivot member defines a spindle hole for accommodating the spindle, and the spindle can be chosen as a bolt or a pin having a cap at an end thereof.

The projecting portion can be formed at one end of the pivot member, and the elastic member can be coupled to the other end of the pivot member. Preferably, the elastic member is a spring, for example an extension spring; the pivot member is a crank, which defines a spindle hole for accommodating the spindle at a substantially center portion thereof.

The present invention further proposes an engagement mechanism employed in a first assembly part and a cooperating second assembly part. The first assembly part and the second assembly part have at least one corresponding pair of an opening and an engagement portion respectively, the engagement mechanism comprises: a pivot member provided in the first assembly part to freely pivot therein, the pivot member comprising a projecting portion which can extend outwards of the opening of the first assembly part, an endmost portion of the projecting portion having a double-wedged surface; and an elastic member arranged between the first assembly part and the pivot member providing elastic force for maintaining the projecting portion extending outwards from the opening of the first assembly part to engage with the corresponding engaging portion of the second assembly part.

The above pivot member is pivoted in the first assembly part via a spindle. Preferably, the pivot member defines a spindle hole for accommodating the spindle, and the spindle can be chosen as a bolt or a pin having a cap at an end thereof.

The projecting portion can be formed at one end of the pivot member, and the elastic member can be coupled to the other end of the pivot member. Preferably, the elastic member is a spring, for example an extension spring; the pivot member is a crank, which defines a spindle hole for accommodating the spindle at a substantially center portion thereof.

In addition, the engagement portion of the second assembly part for engaging the projecting portion can be a concave groove or an opening.

The engagement mechanism of the present invention takes advantage of the double-wedged surface of the projecting portion to facilitate the engagement or disengagement; that is, facilitating the assembly and disassembly of the first assembly part and the second assembly par without employing extra disengagement procedures. Compared with conventional mechanisms having to employ extra disengagement procedures to release the engagement, the present invention, not only facilitates engagement and disengagement, but also avoids the need of providing extra disengagement design, thus it simplifies the structure, lowers the cost, and provides convenient assembly and disassembly operation to the first assembly part and the second assembly part. Consequently, the present invention can be employed to overcome the drawbacks in the conventional technology, thus promoting its industrial value.

The present invention is described in the following with specific embodiments, so that one skilled in the pertinent art can easily understand other advantages and effects of the present invention from the disclosure of the invention. The present invention is also implemented and applied according to other embodiments, and details are modified based on different views and applications without departing from the spirit of the invention.

DETAILED DESCRIPTION OF THE PREFERRED EMBODIMENTS

Figure 1:
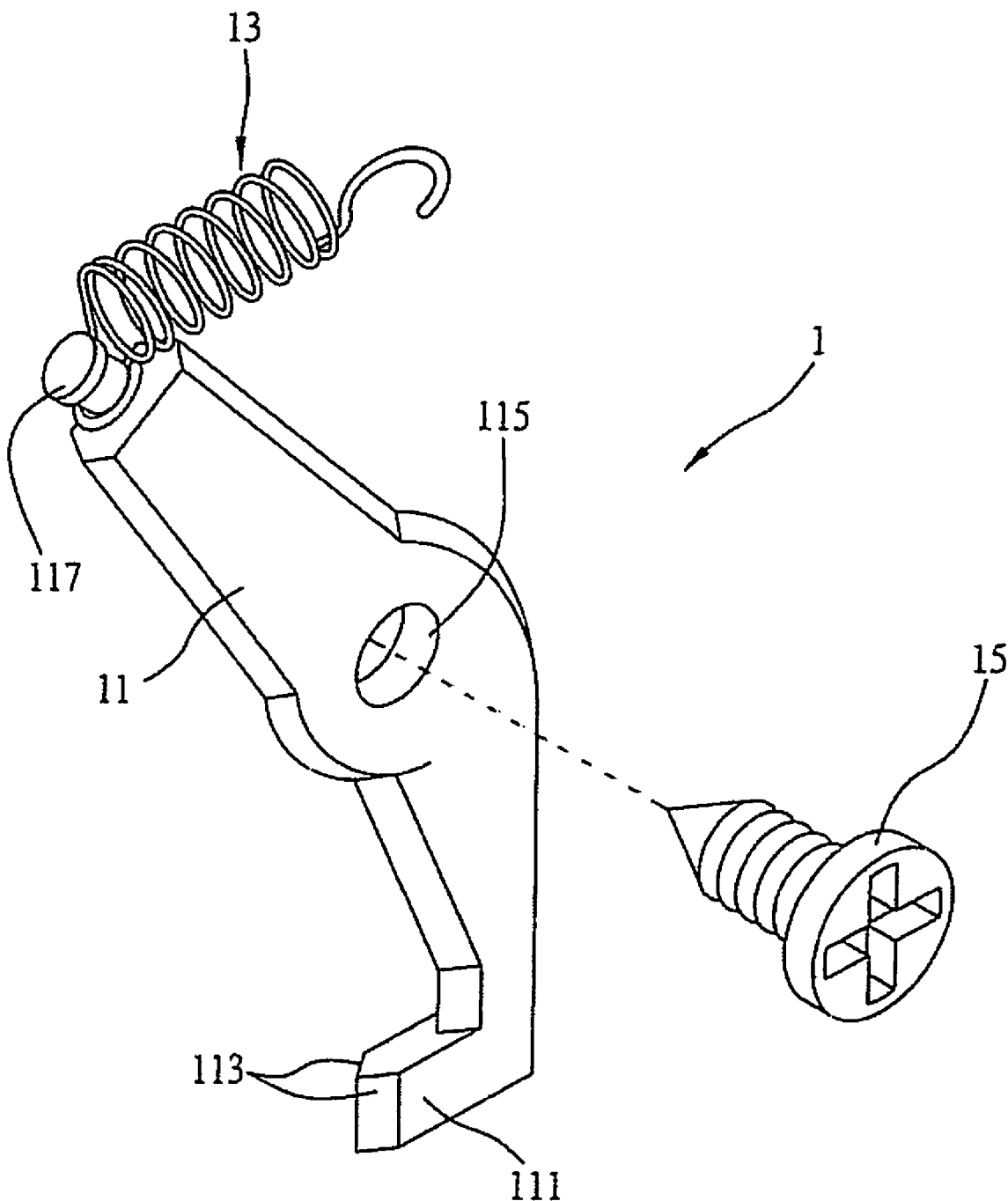
FIG. 1 is a schematic view showing the structure of an engagement mechanism of the present invention.

Referring to FIG. 1, a schematic view showing the structure of an engagement mechanism of the present invention is illustrated. As shown in the figure, the engagement mechanism 1 of the present invention comprises: a pivot member 11 and an elastic member 13. In the present embodiment, the pivot member 11 can be chosen as a crank, and the pivot member 11 is configured with a spindle hole 115 in a substantially center portion thereof. The spindle hole 115 can be inserted with a bolt 15 serving as a spindle, so that the pivot member 11 freely pivots on the spindle hole 115 or the bolt 15 serving as an axis. The pivot member 11 comprises a projecting portion 111 at an end thereof, and the projecting portion 111 comprises a double-wedged surface 113 at an endmost portion; the pivot member 11 comprises a protruding post 117 at another end thereof opposite to the projecting portion 111 for coupling one end of the elastic portion 13. In the present embodiment, the bolt 15, which has a positioning function, is exemplified to serve as a spindle; it is to be noted that the bolt 15 is used for the purpose of providing a positioning spindle to the pivot member 11, which can be alternatively replaced with a pin having a cap portion, but not limited to the bolt 15.

Figure 2:
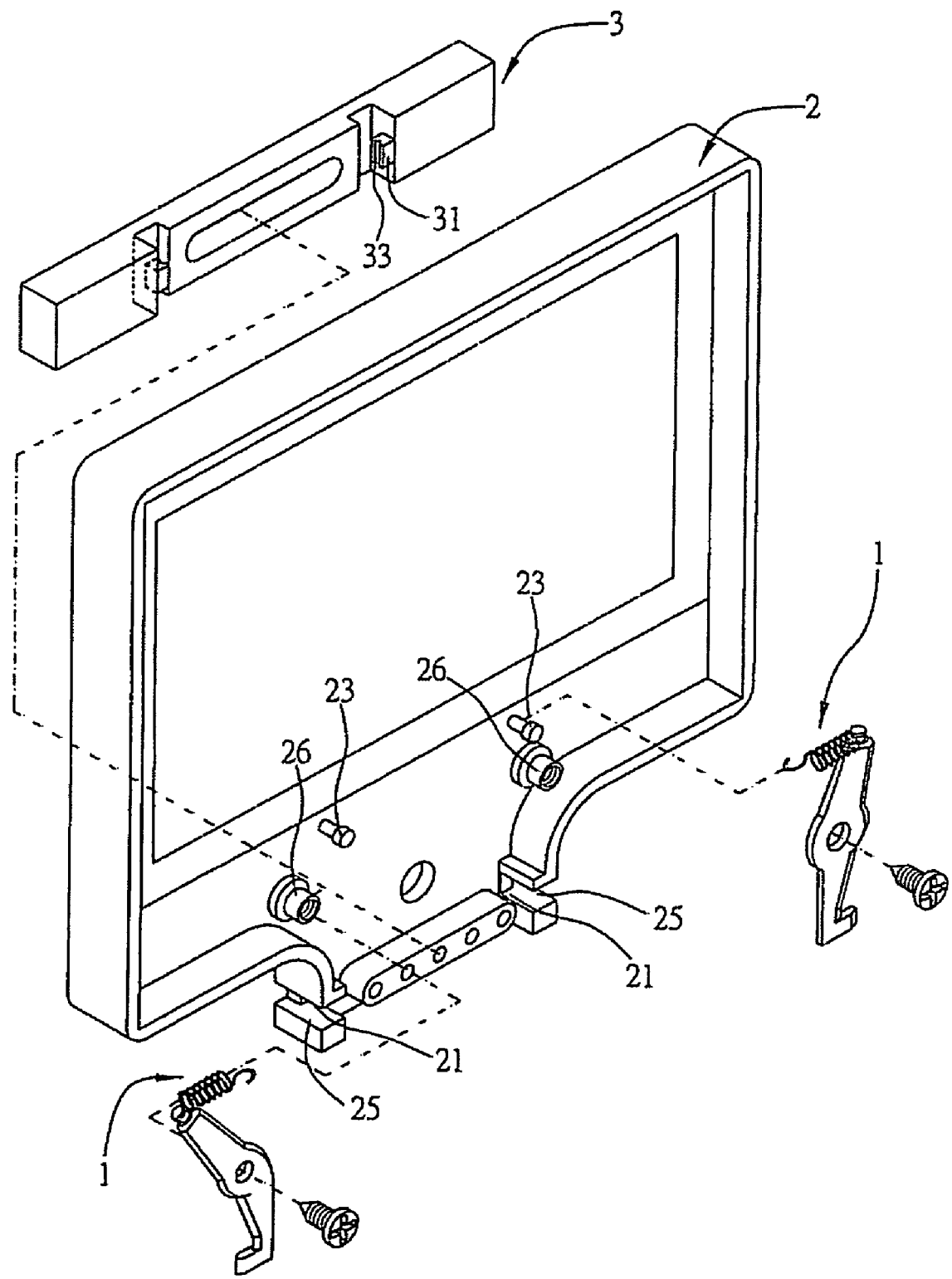
FIG. 2 is an exploded schematic view showing the engagement mechanism of the present invention at use.
Figure 3:
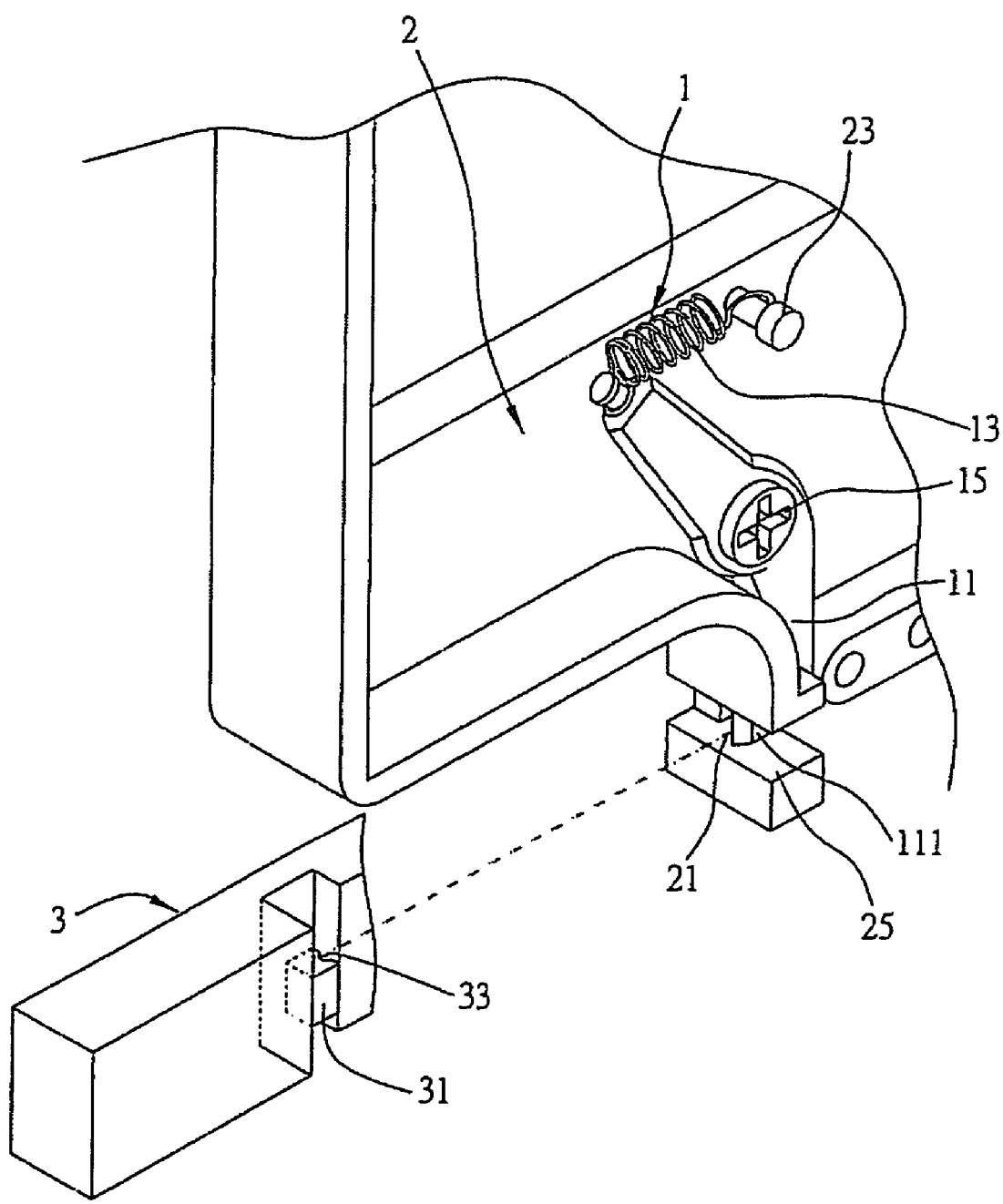
FIG. 3 is a partly enlarged schematic view of FIG. 2.

Referring to FIG. 2 and FIG. 3, an exploded schematic view showing the engagement mechanism of the present invention at use and a partly enlarged schematic view thereof are illustrated. As shown in the figures, the engagement mechanism 1 of the present invention can be applied to the engagement of a first assembly part 2 and a second assembly part 3; as an example, both lateral sides of an inner portion of the first assembly part 2 are respectively assembled with an engagement mechanism 1. In the present embodiment, the first assembly part 2 is explanatorily chosen as a housing of a display panel, and the second assembly part is explanatorily chosen as a speaker set.

Both lateral sides of the first assembly part 2 for arranging the engagement mechanism 1 respectively defines an opening 21 through which the projecting portion 111 outwardly extends, a protruding post 23 for coupling one end of the elastic member 13, a cylinder pillar 26 for fitting into the spindle hole 115, and a concave portion 25 corresponding to the position of the opening 21. The pivot member 11 is pivoted via the spindle hole 115 engaging with the cylinder pillar 26 via the bolt 15. It is to be noted that, any components providing a pivot relationship can be applied in the present embodiment, such as by engaging a cylinder pillar with a locking ring, or a pin having a cap portion with a cylinder pipe, so long as they achieve the above described pivoting relationship; it is not limited to the engagement of the spindle hole 115 with the cylinder pillar 26 via the bolt 15 shown herein.

The second assembly part 3 comprises convex portions 31 corresponding to the concave portions 25 of the first assembly part 2, and each of the convex portions 31 defines a concave groove 33 for accommodating the corresponding projecting portion 111. In the present embodiment, the concave groove 33 is used to illustrate the engagement with the projecting portion 111, however, when the second assembly part 3 is a hollow housing, the concave groove 33 is equivalent to an opening. For simplicity of the description, the concave groove 33 is used for illustration hereafter, however it is to be noted that the engagement structure may alternatively comprises an opening.

The concave portion 25 and convex portion 31 cooperates with each other for providing partly the desired engagement of the first assembly part 2 and the second assembly part 3, but it is mainly through the engagement mechanism 1, actual engagement is realized.

Figure 4:
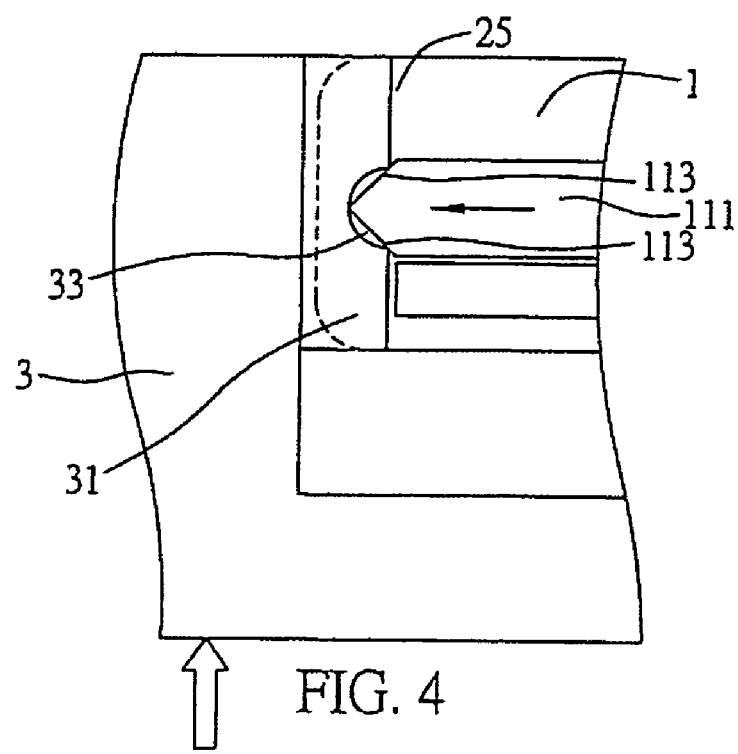
FIG. 4 is a schematic view showing an engaged status of the engagement mechanism of the present invention.

Referring to FIG. 4, the second assembly part 3 can be assembled to the first assembly part 2 from a front face thereof as indicated by the arrow in the figure. The endmost portion of the projecting portion 111 having the double-wedged surface design is taken advantage of, so that when the second assembly part 3 is fitted to the first assembly part 2, each of the convex portions 31 slides into the corresponding concave portion 25, and the projecting portion 111 inwardly retracts due to experiencing a lateral component of force, therefore driving the pivot member 11 to pivot and pull the elastic member 13, at that moment, the elastic member 13 extends and generates compression force. When the concave groove 33 of the convex portion slides into a position aligning with the projecting portion 111, the compression force of the elastic member 13 is released, thus driving the pivot member 11 to pivot, and in turns the projecting portion 111 extends outwardly and abuts against the concave groove 33, realizing the engaging relationship between the second assembly part 3 and the first assembly part 2.

Figure 5:
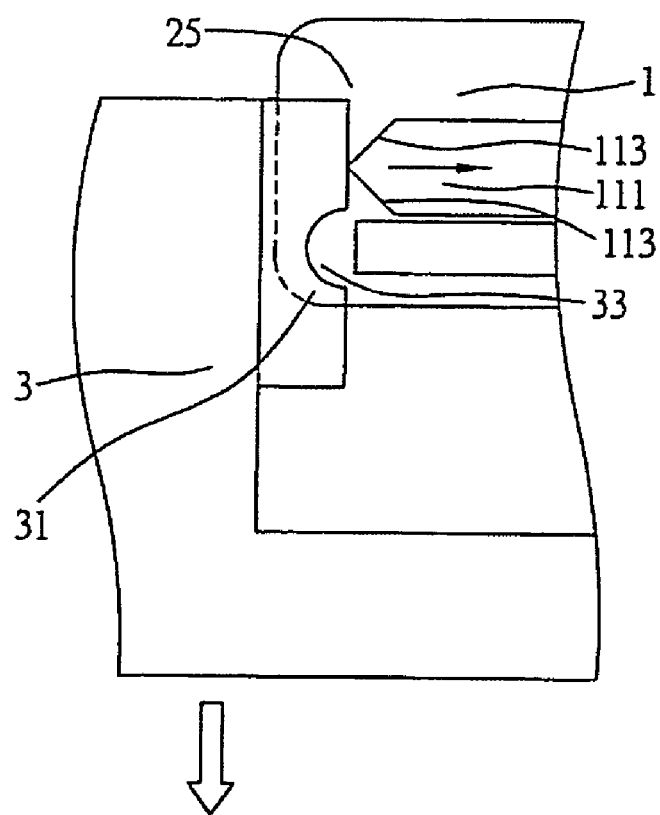
FIG. 5 is a schematic view showing a disengaged status of the engagement mechanism of the present invention.

Referring to FIG. 5, in the disassembly process of the second assembly part 3 from the first assembly part 2, the endmost portion of the projecting portion 111 having the double-wedged surface design is taken advantage of, the convex portion 31 is pulled away from the concave portion 25 via applying force to the second assembly part 3, the projecting portion 111 inwardly retracts due to a lateral component of force, therefore driving the pivot member 11 to pivot and pull the elastic member 13, at that moment, the elastic member 13 extends and again generates compression force. When the convex portion 31 is completely separates from the concave portion 25, the compression force of the elastic member 13 is released, thus driving the pivot member 11 to pivot, so that the projecting portion 111 extends outwardly to return to its original position. Consequently, the engagement mechanism 1 can facilitate easy engagement or disengagement for the assembly and disassembly of the first assembly part 2 and second assembly part 3.

The elastic member 13 is designed for providing elastic force for the projecting portion 111 to extend outwardly from the first assembly part 2. However, under necessary circumstances, a spring having greater coefficient of elasticity can also be employed for providing a greater degree of engagement to more securely assemble the second assembly part 3 to the first assembly part 2, avoiding loose engagement and possible separation.

In the above embodiment, the first assembly part 2 and the second assembly part 3 are respectively illustrated via the housing of the display panel and the speaker set, however it is to be noted that, the engagement mechanism of the present invention can be apply to not only the housing of the display panel and the speaker set shown in the present embodiment, but any two assembly parts for providing engagement relation.

In addition, in an alternative embodiment, only one engagement mechanism 1 is assembled at one lateral side of the first assembly part 1, and a protruding positioning member is arranged at the other lateral side of the first assembly part 2 to correspond to the concave groove 33 at the other side of the second assembly part 3. In the assembly of the second assembly part 3, the concave groove 33 at said other side is firstly engages with the protruding positioning member, and the engagement mechanism 1 is then engaged with the corresponding concave groove 33. Under such circumstance, convenient assembly and disassembly operation can also be achieved. Thus, the number of the engagement mechanism used is not limited to those illustrated in the present invention.

Additionally, the engagement relation can also be achieved by using only the projecting portion 111 of the engagement mechanism 1 in the first assembly part 2 and the second assembly part 3 having the concave groove 33 without the additional convex portions 31 and concave portions 25 designed as position limiters.

The engagement mechanism of the present invention takes advantage of the double-wedged surface of the projecting portion, therefore achieving easy engagement and disengagement; that is, facilitating the assembly and disassembly of the first assembly part and the second assembly part without employing extra disengagement procedures. Compared with the conventional mechanism that has to employ extra disengagement procedures to release the engagement, the present invention, not only provides a much easier engagement or disengagement mechanism, but also avoids conventional disengagement procedures, thus simplifying the structure and lowering the production cost. Consequently, the present invention can be employed to overcome the drawbacks of the conventional technology and promote its industrial value.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. An engagement mechanism, which engages a first assembly part with a cooperating second assembly part, the first assembly part having a pair of concave portions and the second assembly part having a pair of engagement portions, wherein the concave portions correspond in position to the engagement portions respectively, the engagement mechanism comprising:

a pair of pivot members provided in the first assembly part to freely pivot therein, each of the pivot members comprising a projecting portion which extends outwards of a corresponding one of the concave portions of the first assembly part, an endmost portion of each of the projecting portions having a double-wedged surface; and a pair of elastic members arranged between the first assembly part and the pivot members providing elastic force for maintaining a corresponding one of the projecting portions extending outwards from a corresponding one of the concave portions of the first assembly part and engaged with a corresponding one of the engagement portions of the second assembly part, wherein when the engagement mechanism is fitted to the second assembly part, each of the double-wedged surfaces abuts against the corresponding one of the engagement portions, wherein each of the engagement portions is a concave groove, and wherein the first assembly part comprises a pair of protruding posts for coupling one end of a corresponding one of the elastic members, and wherein each of the engagement portions is slided into the corresponding one of concave portions without rotating the first assembly part and the second assembly part for assembling the first assembly part and the second assembly part, and each of the engagement portions is pulled away from the corresponding one of concave portions without rotating the first assembly part and the second assembly part for disassembling the first assembly part and the second assembly part.

2. The engagement mechanism as claimed in claim 1, wherein an end of each of the pivot members is formed with a corresponding one of the projecting portions.

3. The engagement mechanism as claimed in claim 1, wherein each of the projecting portions is pivoted in the first assembly part via a spindle.

4. The engagement mechanism as claimed in claim 3, wherein each of the pivot members defines a spindle hole for accommodating the spindle.

5. The engagement mechanism as claimed in claim 4, wherein each of the spindles is a bolt.

6. The engagement mechanism as claimed in claim 5, wherein each of the spindles is a pin having a cap at an end thereof.

7. The engagement mechanism as claimed in claim 1, wherein an end of each of the pivot members is formed with one of the projecting portions, and the other end of each of the pivot members is coupled to one of the elastic members.

8. The engagement mechanism as claimed in claim 1 or 7, wherein each of the elastic members is a spring.

9. The engagement mechanism as claimed in claim 8, wherein each of the springs is an extension spring.

10. The engagement mechanism as claimed in claim 1 wherein each of the engagement portions is an opening.

* * * * *